FILTER MEDIA

Erle V. Painter, Jr., La Grange, and William R. Strickel, Chicago, Ill., assignors to Johnson & Johnson, New Brunswick, N.J., a corporation of New Jersey
No Drawing. Filed Sept. 28, 1961, Ser. No. 141,280
5 Claims. (Cl. 210—504)

This application is a continuation-in-part of our copending application S.N. 714,012 filed on February 10, 1958, now abandoned.

This invention relates to filter media, and more particularly to such media composed of at least two layers, a relatively more porous layer composed of crimped fibers, and a less porous layer composed of crimped fibers, each surface of which media includes a bonded zone containing about 10 to 90 percent by weight of the total fibers thereof.

Various filter media have been proposed heretofore for the separation of solid material from fluid material, e.g., for the filtration of fresh milk. One such filter material contains about 15 percent of thin, kinky cotton and 85 percent of straight rayon fibers having a diameter of 0.0011 inch. Such materials are disadvantageous according to present day standards from the retention efficiency viewpoint. The art is confronted by the problem of providing economic and efficient filter media having adequate flow rate for practical purposes and improved efficiency and endurance properties.

The discoveries associated with the invention and relating to solution of the above problems, and the objects achieved in accordance with the invention as set forth herein include: the provision of a filter media which permits rapid filtration of large quantities of fluid with optimum retention of solids and which has sufficient strength to be self-sustaining without supporting gauze or the like, the provision of a filter sheet of matted fibers of at least 1 mm. (approximately .04 inch) in length, and crimped fibers having at least three crimps and having a wave length and amplitude in the range of 0.01 to 0.33 inch comprising (a) a coarser top layer making up about 40 to 90 percent of the sheet and substantially composed of crimped synthetic fibers of a fineness weight in the range of 4.2 to 28 micrograms per inch for a material having the density of cellulose, and (b) a finer bottom layer making up 60 to 10 percent of the weight thereof and substantially composed of crimped synthetic fibers of a fineness weight in the range of 2.8 to 6 micrograms per inch on a similar basis, the sheet being bonded with an adhesive bonding agent to provide bonded zones therein, each of which zones is co-extensive with one of the surfaces of the sheet and contains about 10 to 90 percent by weight of the total matted fibers of the sheet, the total weight of the sheet based on matted fibers being in the range of 1.5 to 3 ounces per square yard, which adhesive is insoluble in cold water; the provision of such a sheet wherein the crimped fibers are of regenerated cellulose; the provision of such a sheet wherein the crimped wave lengths and amplitudes are in the range of 0.02 to 0.17 inch; the provision of a sheet weighing about two ounces per square yard; and other objects which will be apparent as details or embodiments of the invention are set forth hereinafter.

In order to facilitate a clear understanding of the invention, the following preferred specific embodiments are described in detail.

EXAMPLE 1

A composite filter sheet of matted, crimped regenerated cellulose fibers comprising at least two layers, referred to as a top or incoming layer (a) and a bottom or outgoing layer (b), is prepared by depositing the various layers of matted fibers in sequence starting with the bottom layer; e.g., by means of conventional carding machines, or by an isotropic arrangement. The filter is of the following composition (fiber fineness being expressed as weight in micrograms per inch):

*Top layer.—Part (1)*

33⅓% by weight of total matted fibers containing an intimate blend of
50% crimped rayon (15.5 fineness) and
50% crimped rayon (8.4 fineness).

*Part (2)*

33⅓% by weight of total matted fibers containing an intimate blend of
50% crimped rayon (15.5 fineness) and
50% crimped rayon (4.2 fineness).

*Bottom layer*

33⅓% by weight of total matted fibers containing an intimate blend of
50% crimped rayon (4.2 fineness) and
50% crimped rayon (4.2 fineness).

The sheet is impregnated (through-bonded) with a polyvinyl alcohol adhesive, the total adhesive content being 2.75%.

If desired, the above combination sheet may be supported on a web of woven material, such as gauze, or the like, which may be set below the bottom layer, although the filter media has adequate strength for most purposes without such gauze.

The formed composite sheet (including gauze support, if added) is passed between two spaced horizontal rollers of a coating machine, each of which is wetted with an aqueous solution of polyvinyl alcohol adhesive of about 0.70 percent by weight concentration (preferably completely hydrolyzed, soluble in hot water and insoluble in cold water, having a viscosity of 55 to 85 centipoises by the Hoeppler falling ball method with 4% water solution cooled to 20° C.). Equivalent means for coating or treating the sheet with such an adhesive may be used.

The sheet is then dried, e.g., by passing through a hot air oven, and it may be cut into individual filter disks or units of desired size or shape. A typical sheet made in this manner contains about 2 ounces per square yard of matted fibers.

In tests under actual use conditions on a dairy farm, filter disks of these types show very good retention of solid impurities yielding a high quality of filtered fresh milk, and at the same time show high filtration speed (amply sufficient for practical purposes). They also show good wet-strength and endurance under such use conditions.

Comparative heretofore suggested filter disks containing 15 percent of thin, kinky cotton and 85 percent straight rayon fibers having a diameter of 0.0011 inch are referred to as "Example A" hereinafter.

These filter disks are tested by the following procedure: The test disk (6 inch diameter) is mounted in a standard milk strainer (e.g., a commercially available strainer) with the top layer facing up, wet by pouring one pint of clear water into the strainer, and a mixture of 0.4 gram of Alundum (crushed fused aluminum oxide, wet sieved to a particle size in the range of 74 to 88 microns) in 3 pints of water, is poured into the strainer, followed by two one-pint water washes, and the resulting filtrate is filtered again through a #42 Whatman filter paper. The latter is burned, leaving only the Alundum passed by the test disk, and this residue is weighed. The following results are typical.

TABLE 1

| Example No. | Flow rate (seconds for continuous flow passage of 3 pint pouring) | Retention (percent of total sediment added retained by test disk) |
| --- | --- | --- |
| A | 6.0 | 67.4 |
| 1 | 5.0 | 98.4 |

It is evident from the foregoing data that the filters of Example 1 show a substantial overall improvement over that of Example A, especially considering both the rate and the retention improvements. From the more important practical viewpoint, the Example A filter allows about 10 to 12 times as much sediment to get into the filtrate as compared to Example 1.

EXAMPLE 2

A filter is prepared using the procedure of Example 1, but of the following composition:

*Top layer*

33⅓% by weight of total matted fibers containing an intimate blend of
50% crimped rayon (15.5 fineness) and
50% crimped rayon (5.6 fineness).

*Bottom layer*

33⅓% by weight of total matted fibers containing an intimate blend of
50% crimped rayon (5.6 fineness) and
50% crimped rayon (5.6 fineness).

*Alternate top layer*

33⅓ by weight of total matted fibers containing an intimate blend of
50% crimped rayon (15.5 fineness) and
50% crimped rayon (5.6 fineness).

Total fiber weight in this sheet is about 2.2 ounces per square yard and contains about 8.3% bonding agent. It may be noted that both the top layer and the alternate top layer are of the same composition, so that either side of the sheet may be used as the top or incoming side.

Comparable results to the foregoing may be achieved with various modifications thereof including the following. The fibers should be at least 10 mm. in length and preferably of a convenient length to be handled by conventional carding machines, including those which give an isotropic or random arrangement of the fibers. Also, the longer fibers tend to give products having better wet-strength. There is no fixed upper limit for the fiber length, except, of course, the size can be handled on the carding or other machine, or the size of the finished material.

The fiber fineness is conveniently expressed in terms of micrograms per linear inch, as known in the art (as determined by weighing measured lengths of fibers or by using known instruments, e.g., a commercially available instrument) the actual equivalent average diameter may be determined from this value and the density of the fiber. Cellulosic materials are economically available in abundant supply, and are preferred for economic reasons. However, other known fibers may be used, e.g., synthetic organic, and the like fibers, including mixtures of different fibers. The fiber fineness weight of the materials in the top layer may be in the range of 4.2 to 28 micrograms per inch for the crimped material on the basis of the density of cellulose, and the fibers in the bottom layer may have a fineness weight in the range of 2.8 to 6 micrograms per inch on such a basis.

The crimps in the fibers may be rough or irregular or regular in a roughly 2-dimensional zone or in a 3-dimensional zone. The wave lengths and amplitudes thereof each may be in the range of about 0.01 to 0.33 inch. The crimped fibers should have at least three crimps or full waves, and this will be reflected in the minimum length thereof.

The coarser or more porous top or incoming layers constitute about 10 to 80 percent of the total weight and the subjacent layer constitutes 90 to 20 percent of the total weight of the matted fibers in these two layers. Additional layers or supports may be included if desired.

Each of the surfaces of the sheet is bonded and each such bonded zone contains about 10 to 90 percent by weight of the total matted fibers of the sheet, and the weight of the sheet based on matted fibers is in the range of about 1.0 to 3 ounces per square yard.

Materials containing no intermediate unbonded zone give satisfactory filtration efficiencies both from the speed and the retention viewpoints. The cost thereof is somewhat higher which is offset by a corresponding greater strength and resistance to tear. The amount of adhesive is in the range of about 2 to 25% based on the weight of total matted fibers. The amount thereof should be sufficient to achieve the desired physical stability or resistance to deformation or change in orientation of the fibers, with minimum interference or interruption of ease of passage of filtrate. From the comparative viewpoint, the through-bonded filters of this invention may employ up to 2 to 4 times as much adhesive as compared to known surface bonded structures.

The bonding agent may be soluble or dispersible in a convenient solvent, but must be insoluble in the liquid which is being filtered, and may be selected from latices of synthetic rubber, polyvinyl chloride or acetate, or the like, or solutions of starch, dextrin, gum arabic, agar agar, sodium alginate, gelatin, casein, and the like; if desired, a starch or the like soluble material may be rendered insoluble by treatment with an appropriate agent, such as urea-formaldehyde or melamine formaldehyde resins, polybasic acids, and the like. Other filter layers may be included in the sheet, if desired, at any location.

The adhesive may be in fibrous form, such as cellulose acetate or the like fibers. Such material is activated or rendered adhesive by means of the inclusion of a plasticizer therein, and also by the application of heat. This plasticizer may be included in the fiber at the time of its manufacture, or it may be introduced therein at a later time. Compression may be applied to control the thickness or density of the final bonded product. The elevated temperature used in activating the fiber should be well below the heat degradation tolerance of the fiber.

The fiber composition may be entirely of the heat activatable type, or it may be a blend thereof with other fibers which are not heat-activatable. Such a blend should contain at least about 10% by weight of the heat-activatable fibers. Preferably, the outer surface of the composite sheet includes heat-activatable fibers.

Where the composite sheet is made up of the coarser incoming layer and the finer subjacent layer, the outer surfaces of the composite should each be bonded. However, where there are additional subjacent layers, it is essential that the outer surfaces of the composite sheet be bonded. The intermediate layers or zones may be separately bonded, e.g., be heat-activatable fibers, and the outer surfaces bonded by a liquid dispersion or solution of an adhesive.

When fiber fineness is referred to herein, the intended meaning is average fineness. The stated fineness is the average of all of the fiber in the indicated part of the composite.

In view of the foregoing disclosures, variations or modifications thereof will be apparent, and it is intended to include within the invention all such variations and modifications except as do not come within the scope of the appended claims.

We claim:

1. A filter sheet consisting essentially of matted crimped, synthetic fibers of at least .04 inch in length having at least 3 crimps of a wave length and amplitude in the range of 0.01 to 0.33 inch, said filter sheet having at least two distinct layers including a coarse incoming layer comprising 40 to 90 percent of the weight of the matted fibers and composed of crimped fibers of a fineness in the range of 4.2 to 28 micrograms per lineal inch for a material having the density of cellulose and a finer subjacent layer comprising 60 to 10 percent of the weight of the matted fibers and composed of crimped fibers of a fineness in the range of 2.8 to 6.0 micrograms per inch for a material having the density of cellulose, and an adhesive bonding agent, said sheet being bonded with said adhesive bonding agent and defining two continuous and contiguous zones within said sheet having different filtering characteristics corresponding to said two distinct layers, the weight of the fibers in said sheet being in the range of 1 to 3 ounces per square yard, the amount of adhesive being in the range of 2 to 25% of the weight of the fibers in said sheet.

2. A filter sheet of claim 1 wherein the crimped fibers are of regenerated cellulose.

3. A filter sheet consisting essentially of matted crimped, synthetic fibers of at least .04 inch in length having at least 3 crimps of a wave length and amplitude in the range of 0.01 to 0.33 inch, said filter sheet having three distinct layers including coarse incoming layers comprising 40 to 90 percent of the weight of the matted fibers and composed of crimped fibers of a fineness in the range of 4.2 to 28 micrograms per lineal inch for a material having the density of cellulose and a finer layer intermediate said incoming layers comprising 60 to 10 percent of the weight of the matted fibers and composed of crimped fibers of a fineness in the range of 2.8 to 6.0 micrograms per inch for a material having the density of cellulose, and an adhesive bonding agent, said sheet being bonded with said adhesive bonding agent and defining three continuous and contiguous zones within said sheet having different filtering characteristics corresponding to said three distinct layers, the weight of the fibers in said sheet being in the range of 1 to 3 ounces per square yard, the amount of adhesive being in the range of 2 to 25% of the weight of the fibers in said sheet.

4. A filter sheet of claim 3 wherein the crimped fibers are of regenerated cellulose.

5. A filter sheet consisting essentially of matted crimped, synthetic fibers of at least .04 inch in length having at least 3 crimps of a wave length and amplitude in the range of 0.01 to 0.33 inch, said filter sheet having at least two distinct layers including a coarse incoming layer composed of crimped fibers of a fineness in the range of 4.2 to 28 micrograms per lineal inch for a material having the density of cellulose and a finer subjacent layer composed of crimped fibers of a fineness in the range of 2.8 to 6.0 micrograms per inch for a material having the density of cellulose, and an adhesive bonding agent, said sheet being bonded with said adhesive bonding agent and defining two continuous and contiguous zones within said sheet having different filtering characteristics corresponding to said two distinct layers, the weight of the fibers in said sheet being in the range of 1 to 3 ounces per square yard, the amount of adhesive being in the range of 2 to 25% of the weight of the fibers in said sheet.

References Cited by the Examiner

UNITED STATES PATENTS

| | | | |
|---|---|---|---|
| 2,433,531 | 12/1947 | Ryan | 210—508 XR |
| 2,834,730 | 5/1958 | Painter | 210—504 |
| 3,003,643 | 10/1961 | Thomas | 210—504 XR |

FOREIGN PATENTS 827,643  2/1960  Great Britain.

JULIUS GREENWALD, *Primary Examiner.*
EARL M. BERGENT, ALBERT T. MEYERS,
*Examiners.*